Nov. 8, 1960

W. M. McCONNELL 2,959,268

PIPE HANDLING APPARATUS

Filed Aug. 5, 1959

INVENTOR.
William M. McConnell
BY Webb, Mackey & Burden
HIS ATTORNEYS

INVENTOR.
William M. McConnell
BY Webb, Mackey & Burden
HIS ATTORNEYS

INVENTOR.
William M. McConnell
BY Webb, Mackey & Burden
HIS ATTORNEYS

Nov. 8, 1960 W. M. McCONNELL 2,959,268
PIPE HANDLING APPARATUS
Filed Aug. 5, 1959 8 Sheets-Sheet 5

INVENTOR.
William M. McConnell
BY Webb, Mackey & Burden
HIS ATTORNEYS

INVENTOR.
William M. McConnell
BY Webb, Mackay & Burden
HIS ATTORNEYS

Nov. 8, 1960   W. M. McCONNELL   2,959,268
PIPE HANDLING APPARATUS
Filed Aug. 5, 1959   8 Sheets-Sheet 8

Fig. 16

INVENTOR.
William M. McConnell
BY Webb, Mackey & Burden
HIS ATTORNEYS

United States Patent Office 2,959,268
Patented Nov. 8, 1960

2,959,268

PIPE HANDLING APPARATUS

William Mynard McConnell, Pittsburgh, Pa., assignor to Taylor-Wilson Manufacturing Company, Pittsburgh, Pa., a corporation of Pennsylvania Filed Aug. 5, 1959, Ser. No. 831,758

23 Claims. (Cl. 198—19)

This invention relates to pipe or tube handling apparatus and, more particularly, to apparatus which picks off lengths of pipe from a support therefor, which conveys the lengths of pipe from one station to a second station, which aligns the pipe, and which indexes it at the second station. The invention is especially useful in connection with hydraulic pipe testers, pipe facers, pipe cut-off machines, coupling screw-on machines and pipe threaders.

In pipe and tube manufacturing, lengths of pipe or tube are subjected to hydraulic testing to determine whether they can withstand specified internal hydraulic pressures. Usually the testing is performed on a test bench which comprises at least one pair of spaced apart test heads, one or both of which travel towards and away from the other to effect a sealing of the ends of the pipe prior to the hydraulic testing. Once the seal has been made with the ends of the pipe, the pipe is subjected to water under pressure for a short period of time.

Before hydraulically testing a length of pipe on a test bench, a number of operations must be performed on the length of pipe. These operations include (1) picking off the length of pipe from skids or other similar structure which support the pipe adjacent the test bench; (2) conveying the length of pipe from the skids into the test bench; (3) aligning the length of pipe prior to its delivery into the test bench so that it enters the test bench between the two spaced apart test heads; and (4) indexing the length of pipe in the test bench axially between the two spaced apart test heads so that each head engages an end of the pipe upon advancement thereof to and into engagement with the pipe.

Following completion of hydraulic testing, the length of pipe is removed from the test bench and then conveyed away to a specified destination. Heretofore a plurality of devices performed the operations of (1) picking off the length of pipe from skids; (2) conveying the pipe to the test bench; (3) aligning the length of pipe prior to its delivery into the test bench; (4) indexing the length of pipe in the test bench; (5) removing the length of pipe from the test bench after completion of hydraulic testing; and (6) conveying the length of pipe away from the test bench. These devices require a source of power, controls, coordination with the other devices and the test bench, separate installation, maintenance and repair.

Some of the previous conveying apparatus in transferring the pipe into the test bench or in picking the pipe off of skids imparted roll to the pipe. Rolling pipe into a test bench is undesirable due to impact of the pipe against a stop or other similar element of a test bench. This is particularly true in the case of long lengths of large diameter pipe where impact of the pipe against the stops in the machine causes damage to the test bench and jarring of the bench and its controls.

One type of pipe conveying apparatus now in use is the well known walking beam mechanism which comprises a combination of levers, shafts, connections and accessories to transfer a pipe from one station into a test bench. Walking beam mechanisms are not only complicated and expensive but have high maintenance costs.

In some cases, operation of a walking beam mechanism imparts rolling to the pipe as the pipe is advanced from one station to another.

Many of the pipe handling devices now in use are satisfactory for production operations where large numbers of pipe of one size both as to length and diameter are processed. However, these devices are not adapted for jobbing operations wherein a variety of different size pipe, both as to diameter and length, must be handled.

My invention in pipe conveying apparatus effectively combines the six operations of (1) pick-off, (2) conveying, (3) aligning, (4) indexing, (5) removing, and (6) advancing or conveying away from a test bench or a station into a single mechanism which capably and efficiently handles both production and jobbing assignments. Specifically, my invention comprises a combination of at least two shafts arranged substantially transverse relative to lengths of pipe which are to be transported from one station to a second station or from one station into a test bench. The shafts are also substantially transverse relative to the station or stations and the test bench and are arranged in tandem so that each engages a part of a pipe along its length. Each shaft has an entry end, an exit end and a continuous helical rib which extends along at least a part of the length of the shaft and runs towards the test bench or a station to which the pipe is to be delivered. The helical rib engages and advances lengths of pipe along the shafts toward the station to which the pipe is to be delivered upon rotation of the shafts about their longitudinal axes. Connected to each of the shafts are means for rotating each about its longitudinal axis to advance the pipe thereon from one station to a second station such as the test bench while simultaneously causing the pipe to travel endwise on the shafts in a direction dependent upon the direction of rotation.

Adjacent the entry end of the shafts is a first station such as a means for holding lengths of pipe to be conveyed to a second station such as the test bench. Adjacent the means for holding lengths of pipe to be conveyed is a pick-off means which engages and transfers a length of pipe from the holding means onto said shafts and into engagement with the continuous helical rib. The pick-off means are drivingly connected to the means which rotate the shafts so that the pick-off means engages and transfers a length of pipe from the holding means onto the shafts at predetermined intervals relative to rotation of the shafts.

Adjacent the exit ends of the shafts are notches or saddles on the periphery thereof. These notches or saddles engage a length of pipe and deposit it onto the station at which the pipe is to be delivered or into the test bench upon rotation of the shafts to a predetermined position. The notches remove the pipe from the station or from the test bench by rotation of the shafts from the predetermined position whereby a part of the periphery of the notch engages the pipe and as the shaft continues to rotate, raises the pipe up from the station or test bench so that the helical rib engages the pipe and moves it away from the station or out of the test bench.

My invention also comprises a combination of a stop member and a support for the stop member which is pivotally mounted upon a movable head of a test bench which hydraulically tests lengths of pipe placed between two spaced apart test heads at least one of which is movable toward and away from the other. The movable test head carries actuating means positioned to engage the support to bring about moving the stop member into a position in front of and substantially across the movable test head on the side opposite the other test head of the test bench when the movable test head travels away from the other test head. The actuating means causes the support to move the stop member out of said position when the movable head travels toward the other head.

In the accompanying drawings, I have shown preferred embodiments of my invention in which.

Figure 1:
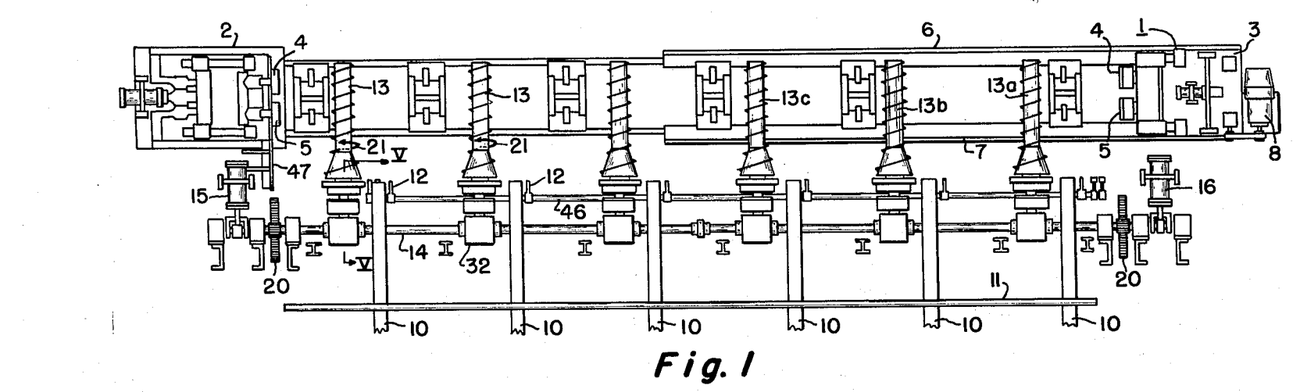
Figure 1 is a plan view of one embodiment of my pipe handling apparatus and of a test bench with two test ends each having two test heads for hydraulically testing two lengths of pipe simultaneously.
Figure 2:
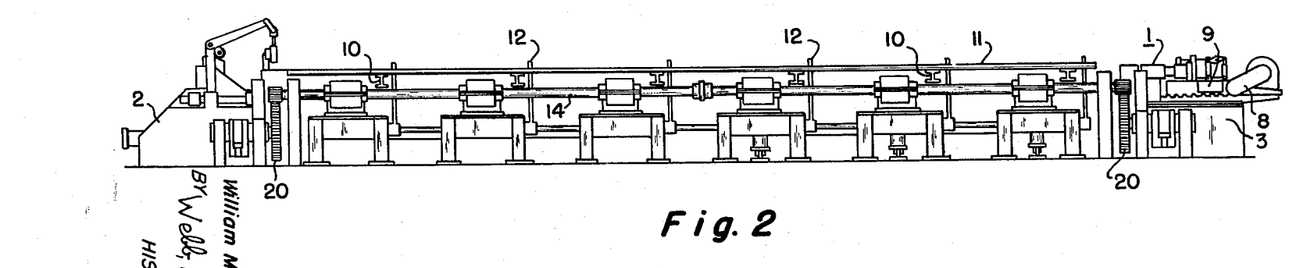
Figure 2 is a side elevation view of the apparatus of Figure 1.

Referring to the drawings, Figures 1 and 2 show a test bench 1 with two test ends 2 and 3 at the left-hand end and right-hand ends of the bench respectively. Each test end has two heads 4 and 5 for simultaneously subjecting two lengths of pipe to hydraulic testing pressures. The testing end 2 is movable a short distance toward and away from the other test end 3 which travels toward and away from the end 2 along tracks 6 and 7 of the bench. A motor actuated drive 8 propels the end 3 along the tracks and a holding unit 9 locks the end 3 in a desired position along the tracks 6 and 7 for hydraulically testing pipe. Since the end 3 is conventional, further description thereof is unnecessary.

Figures 7, 9:
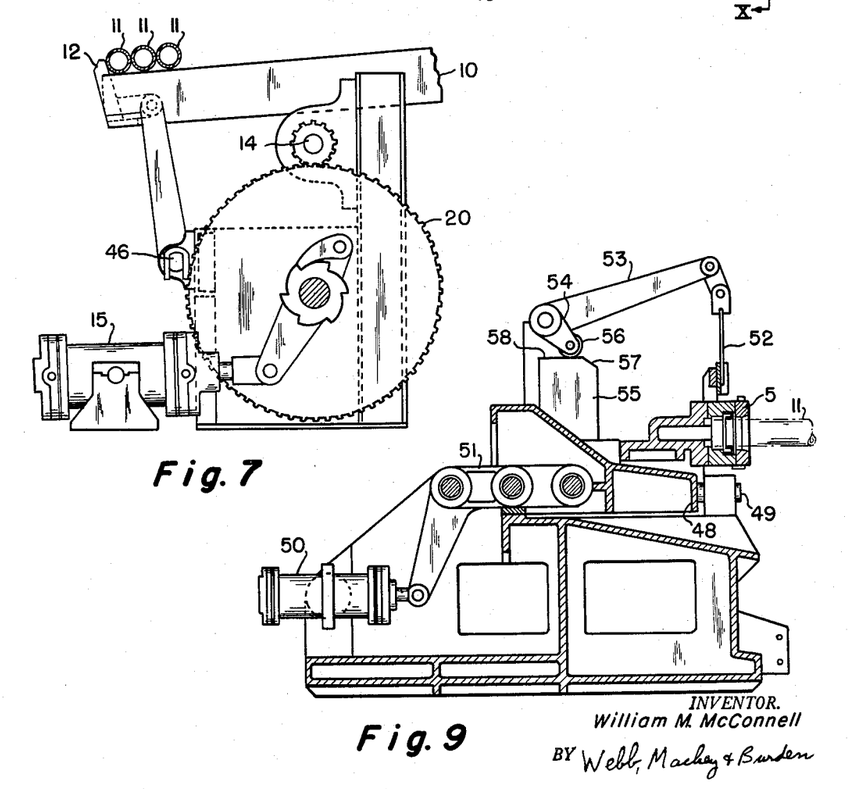
Figure 7 is an end elevation view with some elements omitted showing the drive for the shafts of the apparatus of Figure 1 and showing a stop finger for maintaining lengths of pipe on skids.
Figure 9 is a section view along the line IX—IX of Figure 8 showing the test end advanced to test position.
Figure 8:
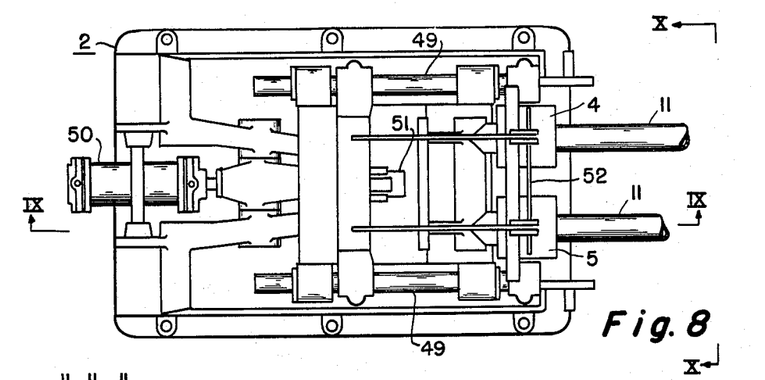
Figure 8 is an enlarged plan view of the left-hand test end of the test bench of Figure 1.

Disposed transversely to the test bench 1 and spaced apart on one side thereof are a plurality of skids 10 arranged in tandem. The skids slope downwardly toward the test bench as shown in Figure 7 and support thereon lengths of pipe 11 for transfer to the bench. A stop finger 12 (Figure 7) adjacent the lower end of at least two of the skids engages and maintains the pipe thereon.

Extending between the skids 10 and the test bench 1 are a plurality of horizontal shafts 13 arranged in tandem and disposed at substantially right angles to the longitudinal axis of the test bench. The shafts support pipe along its length with each shaft engaging a part of the length of the pipe.

A jack shaft 14 driven by a pair of motors 15 and 16 rotate each shaft 13 about its longitudinal axis. As will be described more in detail hereinafter, the shafts 13 convey the lengths of pipe 11 from the skids 10 into the test bench 1 and from the bench to the ends of the shafts 13.

Referring to Figures 3–7 inclusive, each shaft 13 has an entry end 17 adjacent the lower end of the skids and an exit end 18 adjacent the test bench and extending laterally therefrom. The entry end 17 of the shaft 13 is flange shaped and tapers towards the exit end for a short distance along the length of the shaft.

On the periphery of each shaft 13 is a continuous helical rib 19 which extends from the entry end 17 to the exit end 18. Accordingly, as the shafts rotate about their longitudinal axes, the helical rib turns therewith and a length of pipe positioned on the shafts is advanced therealong from the exit end into the test bench 1 and from the test bench to the exit end 18 of the shafts.

I rotatably drive the shafts 13 through the jack shaft 14 whose ends are connected to the two motors 15 and 16 of the reciprocating steam or hydraulic type. Other types of motors such as electrical ones can be substituted for the reciprocating motors. One motor is connected to each end of the jack shaft through gearing 20 and the motors are arranged so that one delivers power while the other is on its return stroke.

Rotation of each shaft 13 is in the direction of arrow 21 viewing Figure 1 so that as the lengths of pipe are advanced from the skids to the test bench, they are moved toward the left, viewing Figure 1.

Connected to the entry end 17 of each shaft and forming a part thereof is a spindle 22 which has one of its ends affixed to the shaft by a bolt 23 and which mounts a bevel gear 24 keyed thereto at the other end. The bevel gear 24 engages a second bevel gear 25 keyed to the jack shaft 14 and in this way, the motors 15 and 16 rotatably drive the shafts 13 through the jack shaft 14.

Keyed to the spindle 22 and rotatable therewith is planetary gearing 26 to which is joined one end 27 of a sleeve 28 by bolts 29. The spindle 22 extends through the sleeve 28 and rotates therein upon pin bearings 30. Planetary gear ratios are such that the sleeve revolves at a rate of one revolution to every four revolutions of the spindle 22 and shaft 13.

In addition to the bolts 29, roller bearings 31 support the sleeve 28 and permit it to rotate in a casing 32 which mounts the roller bearings. This casing houses the bevel gears 24 and 25 and the planetary gearing 26.

Figure 5:
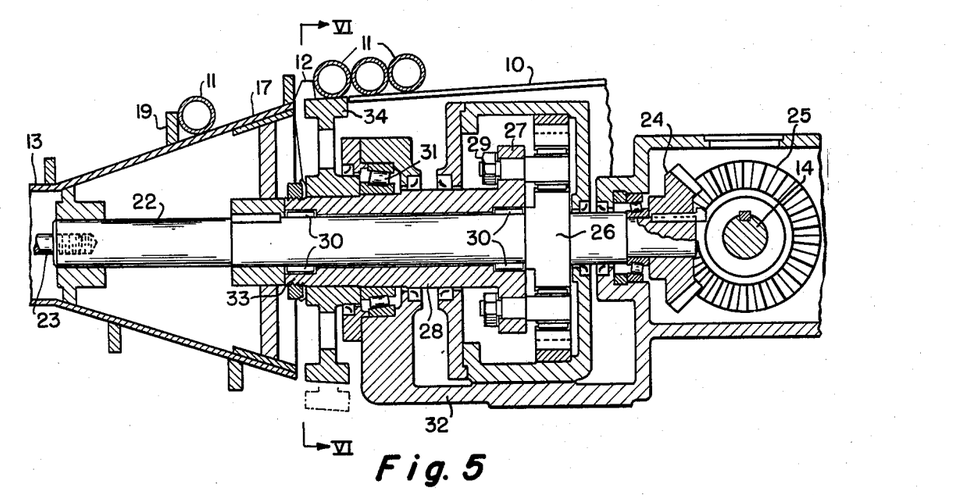
Figure 5 is an enlarged section view along the line V—V of Figure 1.
Figure 6:
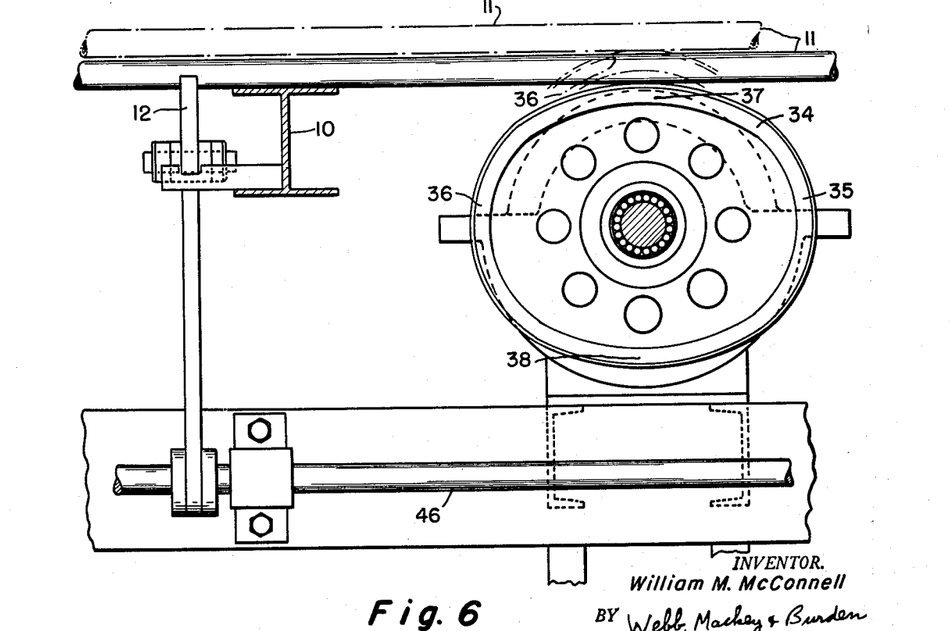
Figure 6 is a section view along the line VI—VI of Figure 5.

Affixed to the sleeve 28 adjacent its other end 33 and rotatable therewith is an eccentric 34 in the form of an ellipse which picks off a length of pipe 11 from the skids 10 and transfers it onto the entry end of the shaft 13 (Figures 5 and 6). The eccentric has two parts 35 and 36 at opposite ends of its major axis which parts pick off a length of pipe as the eccentric revolves with the sleeve and brings one of the two parts 35 or 36 into engagement with a length of pipe on the skids. In picking off a length of pipe from the skids, the part 36 of the eccentric 34 engages the pipe and lifts it over the stop finger 12 (Figure 6) and onto the entry end of the shafts 13.

The two parts 37 and 38 at the opposite ends of the minor axis of the eccentric do not engage the pipe on the skids during revolution on the eccentric.

Figure 12:
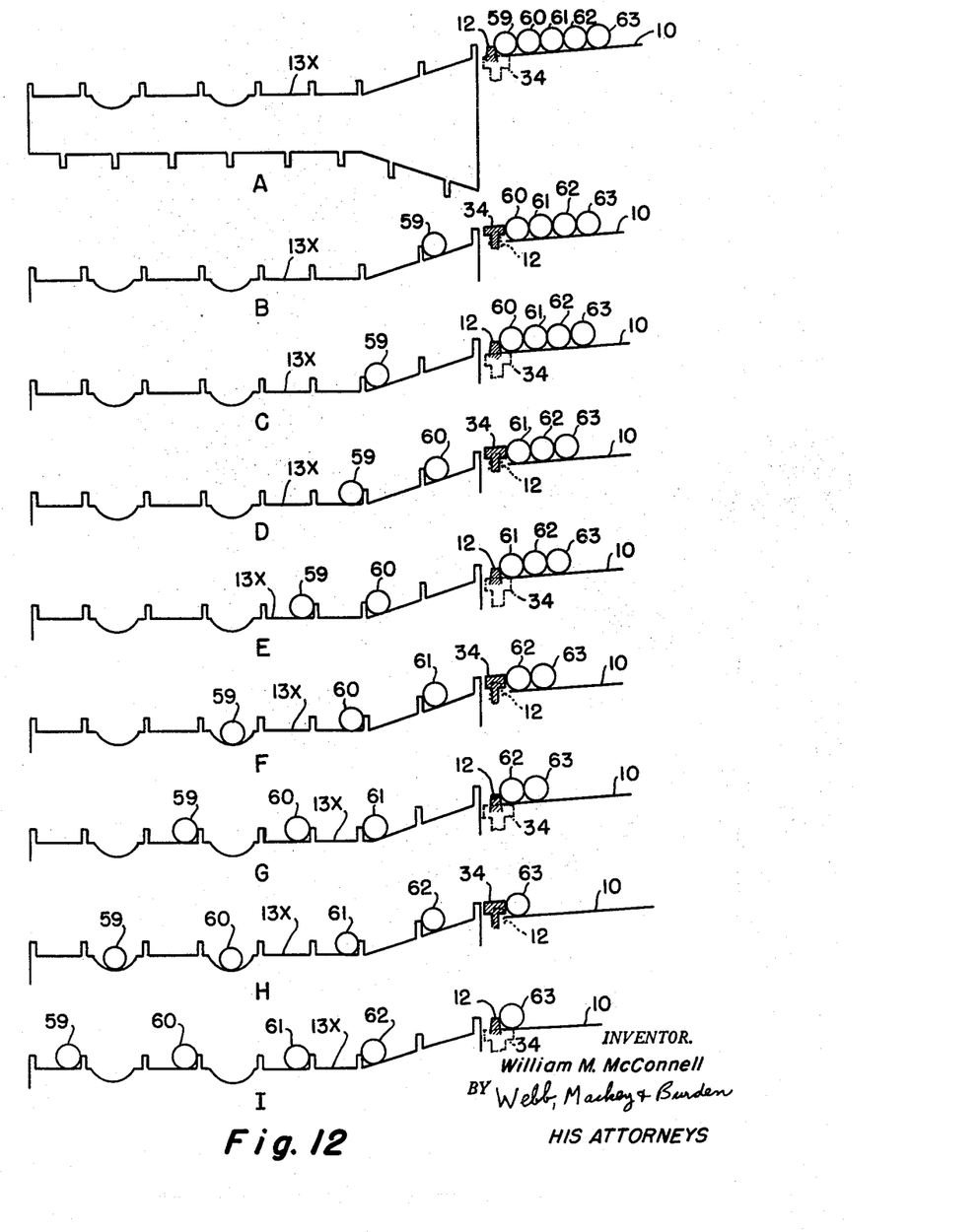
Figure 12 is a schematic diagram showing sequence of operation wherein two lengths of pipe are simultaneously conveyed from skids into the test bench of Figure 1 and are removed from the bench upon completion of hydraulic testing.

Since the sleeve and the eccentric revolve once for every four revolutions of the spindle and since there are two parts 35 and 36 of the eccentric which engage a length of pipe as the eccentric revolves along with the shaft 13, a length of pipe is picked off the skids and transferred onto the shafts once for every two revolutions of the shaft. Figure 12 to be discussed hereinafter illustrates the sequence of operations wherein pipe is picked off from the skids and delivered onto the shafts.

Figure 3:
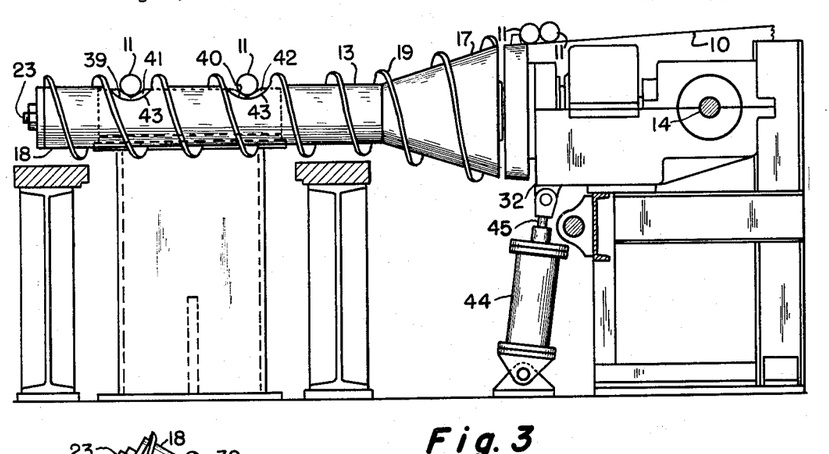
Figure 3 is a side elevation view partly in section of one of the shafts of Figure 1.
Figure 4:
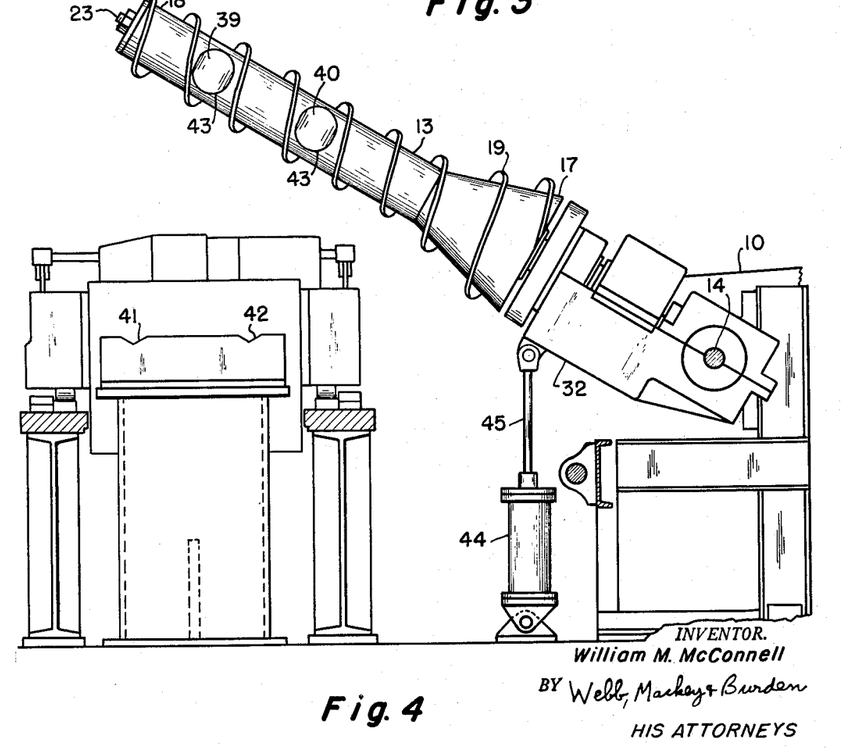
Figure 4 is a side elevation view similar to Figure 3 but with the shaft raised to allow for travel of one of the test ends therebeneath.

As shown in Figures 3 and 4, there are two notches or saddles 39 and 40 on the periphery of each shaft adjacent its exit end 18. These notches are located along the length of the shafts 13 so that notch 39 is aligned with a magnetic holding device 41 of the test bench and so that the other notch 40 is aligned with a second magnetic holding device 42 of the bench. The notches enable the shafts to deposit a length of pipe onto the magnetic holding devices in the test bench 1 which devices are aligned with the test heads 4 and 5 so that a length of pipe located thereon is in position for its ends to be sealingly engaged by the test heads as the heads travel toward and into contact with the ends of the pipe.

As the shafts 13 rotate, they advance lengths of pipe disposed thereon into the test bench and when lengths of pipe 11 reach notches 39 and 40, the lengths of pipe are deposited onto the holding devices as the shaft rotates to the position shown in Figure 3 where the notches are below the holding devices. When the shaft reaches this position, rotation thereof is automatically stopped by conventional means such as limit switches (not shown) and not resumed until after pipe has been hydraulically tested. Following testing of the pipe, the shaft is again rotated whereupon the periphery 43 of the notches engages the pipe, lifts it up off the holding devices and conveys it out of the test bench to the exit end of the shafts.

To permit the test end 3 to travel towards the left, viewing Figure 1, along the tracks 6 and 7, pass shafts 13a, 13b and 13c to engage a short length of pipe, each of these shafts has a hydraulic cylinder 44 for raising it up out of the way of the test end 3 (Figure 4). The cylinder has a piston rod 45 which is connected to the casing 32 and upon travel of the test end 3 towards the shaft, the end engages a limit switch (not shown) which brings about actuation of the cylinder, thus raising the shaft to the position shown in Figure 4. In raising up out of the way of the travel of the test end 3, the shaft pivots about bevel gear 25 of the jack shaft 14. Then when the test end 3 returns from an advanced position, it engages a limit switch or switches (not shown) which effect lowering of the shafts to the horizontal position, shown in Figure 3.

A horizontally disposed rod 46 and I-bars which comprise the skids 10 pivotally mount the stop fingers 12 with one finger being located adjacent the lower end of each skid. Rotation of the rod 46 about its longitudinal axis positions the stop fingers relative to the skids so that the fingers engage different diameter pipe and hold the pipe on the skids until its transfer therefrom onto the shafts 13.

Extending from the test end 2 towards the skids is a vertically positioned plate 47 against which the shafts 13 advance the lengths of pipe 11 as they convey them from the skids into the test bench. During travel of the lengths of pipe toward the test bench, rotation of the shafts about their longitudinal axes causes the left-hand ends of the pipe, viewing Figure 1, to engage the plate 47. In this way, through the combination of the plate 47 and the shafts 13, lengths of pipe are aligned relative to the heads of the test bench prior to their delivery into the test bench 1 so that the pipe enters the test bench between the two test ends 2 and 3.

Figures 10, 11:
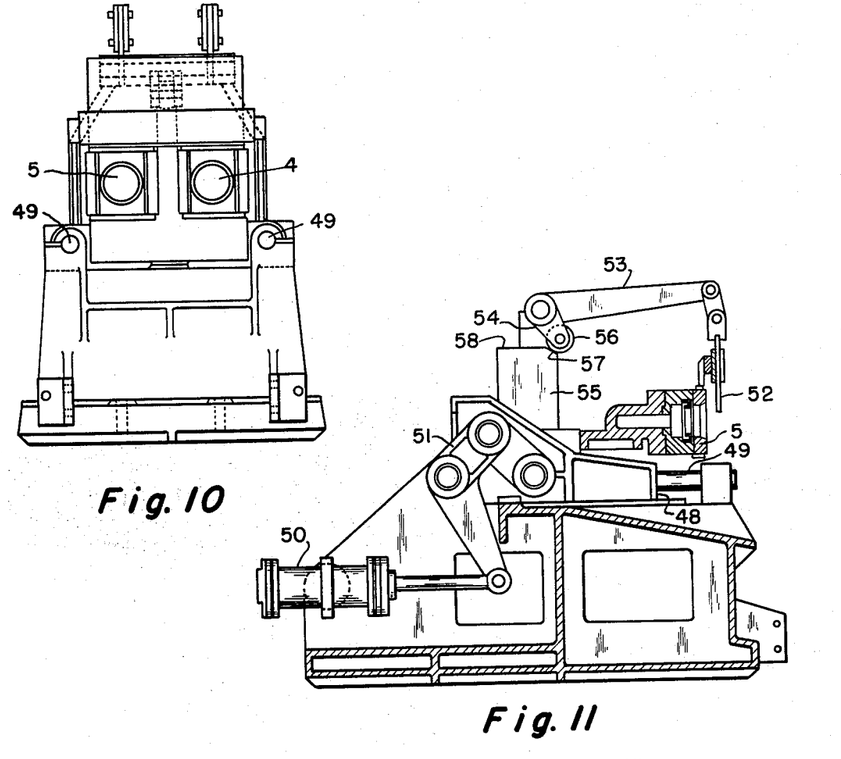
Figure 10 is a view along the line X—X of Figure 8.
Figure 11 is a section view similar to Figure 9 but with the test end withdrawn from test position.

Referring to Figures 8-11, the test end 2 has a carriage 48 which mounts the two test heads 4 and 5 and which is slidably disposed upon parallel, spaced apart ways 49. A hydraulic cylinder 50 connected to the carriage 48 through linkage 51 provides the heads with a short stroke into and out of test position. Test position is that location whereat the heads engage ends of pipe located in the test bench (Figure 9). The test heads are out of test position when they are withdrawn from engagement with the ends of the pipe so that the pipe can be removed from the test bench (Figure 11).

Mounted upon the test end 2 is a stop member 52 carried by one end of an arm 53 whose other end is pivotally connected with a lever 54. The stop member extends in front of and across the two test heads when the heads are out of test position (Figure 11) and is on that side of the heads opposite the other test end 3. The stop member raises to a position above the test heads when they are in test position (Figure 9).

Operation of the stop member to raise and lower it relative to the test heads results from engagement of a cam follower 55 mounted upon the carriage 48 with a cam 56 carried by the lever 54. The cam rides the cam follower and is in contact with a downwardly sloping surface 57 thereof when the test heads are out of test position. As the carriage 48 travels to the right, viewing Figures 9 and 11, to bring the test heads into test position, the cam travels from the sloping surface to a horizontal surface 58 of the cam follower which is connected to and is higher than the sloping surface 57. This travel causes the arm 53 to pivot and raise the stop member 52 to a position above the test heads (Figure 9). Upon withdrawal of the test heads from test position, the cam travels from the horizontal surface to the sloping surface, thereby causing the arm to pivot and lower the stop member to the position in front of and across the test heads (Figure 11).

Figure 12, which comprises views A-I inclusive, shows a sequence of operations in conveying lengths of pipe 59-63 inclusive from the skids 10 into the test bench 1 and out of the test bench to the end of the shafts 13. The views also show positions of the stop finger 12, of the eccentric 34 and of the lengths of pipe 59-63 inclusive relative to the various revolutions of the shaft 13 from a starting position where the pipe is disposed on the skids and there is no length of pipe on the shafts to a position where there is a length of pipe at the exit end of the shaft 13. View A depicts lengths of pipe 59, 60, 61, 62 and 63, stop finger 12, eccentric 34 and the shafts 13 represented by shaft 13X at the start of conveying pipe from the skids into the test bench. Views B-I inclusive show the pipe, stop finger, eccentric and shaft at the end of revolutions 1-8 inclusive of the shaft 13X from its starting position shown in view A.

Figure 13:
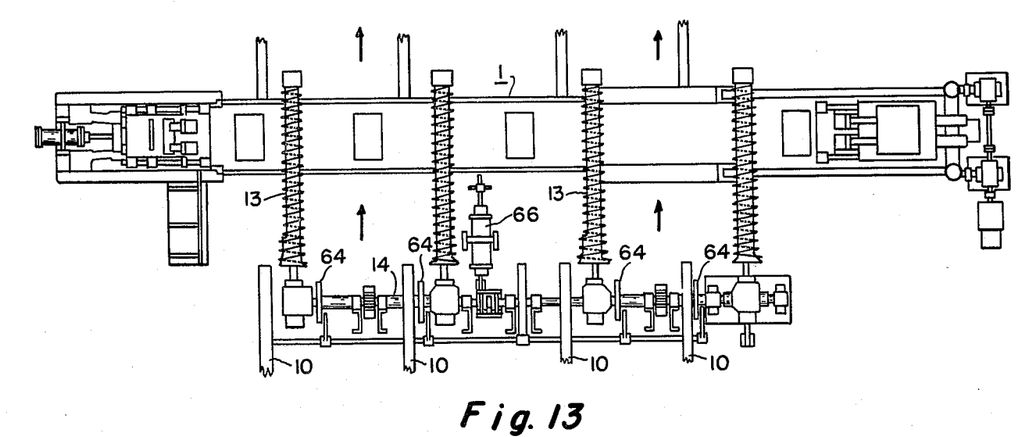
Figure 13 is a plan view of a modification of my invention.
Figure 14:
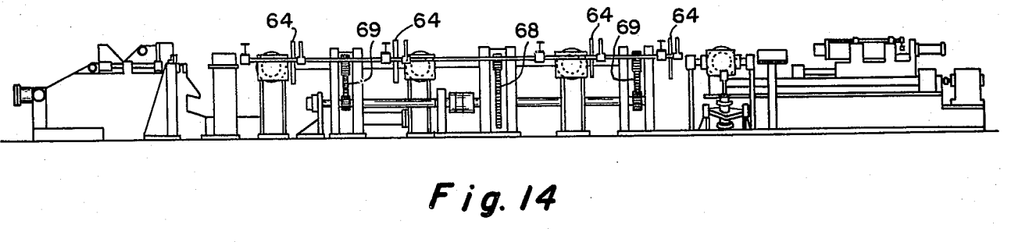
Figure 14 is a side elevation view of a modification of Figure 13.
Figure 15:
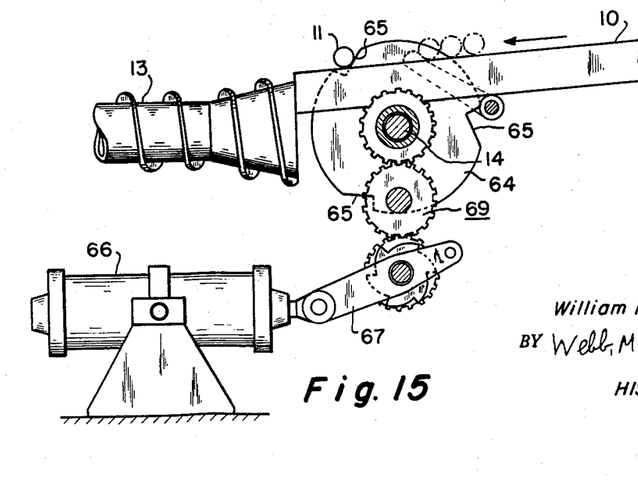
Figure 15 is a fragmentary side elevation view of the drive for the pick-off device of the apparatus of Figure 13.
Figure 16:
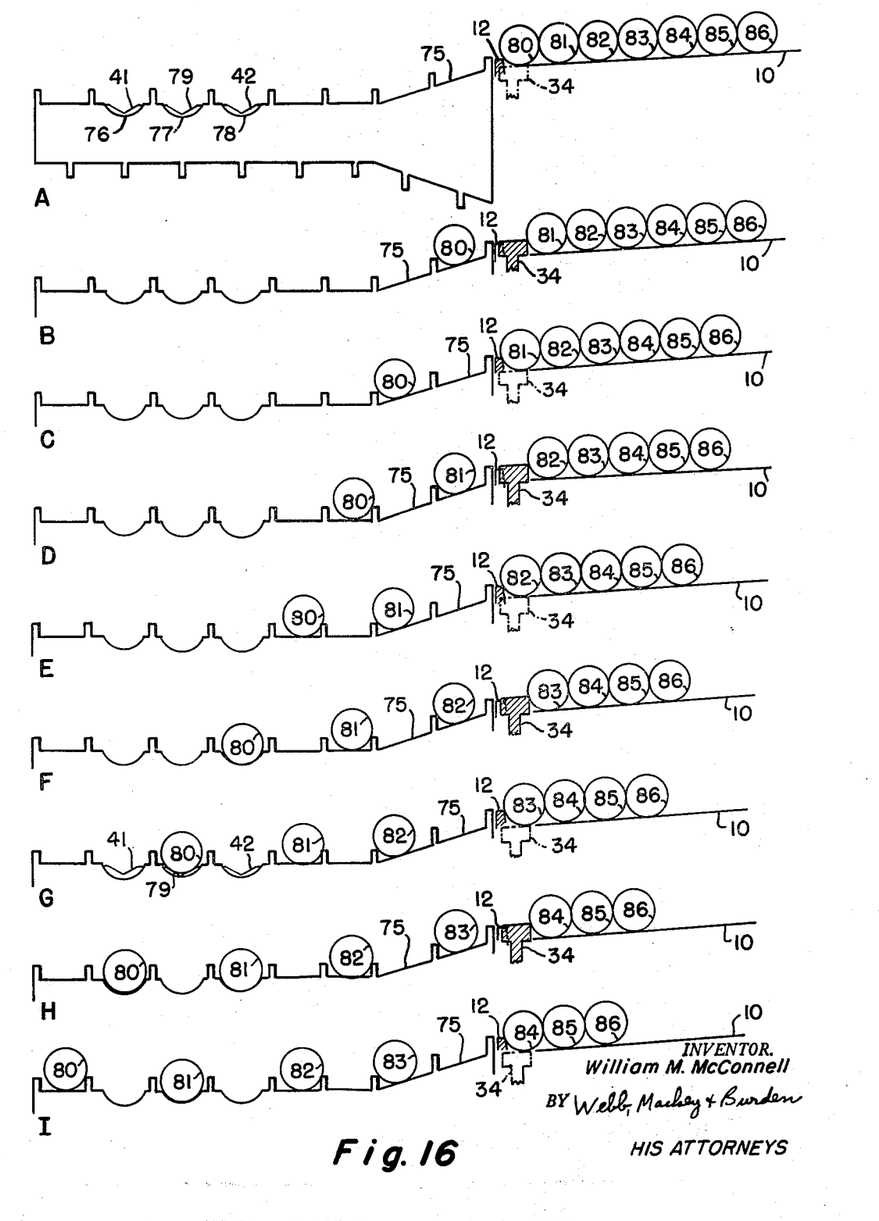
Figure 16 is a schematic diagram showing a sequence of operations wherein single lengths of pipe are conveyed from skids into the test bench of Figure 1 which has an adapter for testing single lengths of pipe.

Figure 16, which comprises views A-I inclusive, and Figure 12 point up the versatility of my invention wherein the handling apparatus of Figures 1-11 inclusive and of Figures 13-15 inclusive can be used to convey two lengths of pipe simultaneously from the skids into the tester or to convey single lengths of pipe from the skids into the tester. Conveying two lengths of pipe simultaneously or single lengths from the skids into the tester and performing the other functions described herein require no change in structure of the handling apparatus. In the case of the two lengths of pipe, both heads of the tester are used as described herein to hydraulically test two lengths fo pipe simultaneously and the size of the pipe may range from .080" to about 2⅜" O.D. In the case of the single lengths of pipe, an adapter (not shown) is placed across the two heads in each end to convert the tester into a single head machine which tests one length of pipe at a time. In the case of the single head machine, the pipe diameter may range from 2⅞" to about 5" O.D.

As shown in Figure 16, a shaft 75 which conveys lengths of pipe from the skids 10 into the test bench and out of the test bench to the end of the shaft has three notches or saddles 76, 77 and 78. Notches 76 and 78 are aligned with magnetic holding devices 41 and 42 which in turn are aligned with the two heads of the test bench of Figure 1. Notch 77 is aligned with a magnetic holding device 79 which in turn is aligned with the adapter for converting the test bench into one which handles single lengths of pipe.

Views A-I inclusive of Figure 16 show the sequence of operations for conveying single lengths of pipe from the skids into the test bench and thence to the end of the shaft 75. View A depicts lengths of pipe 80-86 inclusive on the skids at the start of the conveying operation with stop finger 12 and eccentric 34 in their respective positions. Views B-I inclusive show the pipe, stop finger, eccentric and the shaft at the end of revolutions 1-8 inclusive of the shaft 75 from its starting position. View G shows pipe 80 disposed upon holding device 79 and aligned with the adapter for testing and view I shows pipe 81 in a similar position and pipe 80 at the end of the shaft.

Also, my invention without change in its structure is applicable to handling three lengths of pipe simultaneously and two lengths of pipe simultaneously in connection with a three head bench. It is, in addition, applicable to handling seven lengths of pipe simultaneously and three lengths of pipe simultaneously in connection with an eight head bench.

Figures 13-15 inclusive show a modification of my invention in which a plurality of disks 64 for picking off pipe from skids 10 is located adjacent the lower end of each skid. Each disk has three notches 65 spaced around its periphery with each notch adapted for engaging and picking off from the skids and delivering to the shafts 13 a length of pipe 11. The disk is rotatably mounted upon the jack shaft 14 through a bushing (not shown).

A reciprocating motor 66 similar to the motors 15 and 16 of the apparatus of Figure 1 drives the jack shaft 14 through linkage 67 and a first gear train 68 and also drives the disks 64 through a second gear train 69. The ratio of the two gear trains relative to each other is such that for every three revolutions of the jack shaft 14 and hence the shafts 13, the disks 64 make one revolution. Thus for every revolution of the shafts 13, the disks pick up one length of pipe and deliver it onto the shafts 13.

My invention has important advantages which render it highly useful for conveying pipe from one station to a second station or from one station into a test bench. In the first place, it efficiently and capably performs the following operations: (1) picking off a length of pipe from skids or support for the pipe; (2) conveying the pipe from the skids to a station or into a test bench; (3) aligning the pipe relative to the station or to a test bench prior to its delivery to the station or the test bench; (4) indexing the pipe at the station or in the test bench so that it is in a desired position thereat; (5) removing the pipe from the station or from the test bench; and (6) conveying the pipe away from the station or the test bench. Heretofore, separate and independent mechanisms were required for performing some or each of the aforementioned operations. Thus, my invention eliminates some of these separate and independent mechanisms by combining the operation performed thereby into one apparatus.

In the second place, my invention is suitable for either production or jobbing assignments.

In the third place, it has a greatly simplified motion for performing the operations and its greatly simplified structure requires less electrical equipment, less elements and fewer auxiliary devices. This is particularly true when comparing my apparatus with the walking beam machine with its raising and lowering motion and its many components such as levers, shafts, connections, links, etc., all of which are required to merely advance pipe from one station to another.

In the fourth place, the more simple structure of my pipe handling apparatus effects lower maintenance and repair costs.

In the fifth place, pipe rolling between stations is not a problem in my apparatus.

While I have shown and described preferred embodiments of my invention, it is to be understood that it may be otherwise embodied within the scope of the following claims.

I claim:

1. In pipe testing and handling apparatus for conveying lengths of pipe from one station to a pipe tester having two spaced apart heads, at least one of which is movable toward and away from the other, the combination comprising at least two shafts arranged substantially transverse relative to the lengths of pipe and relative to said pipe tester, said shafts being disposed in tandem so that each engages a part of a pipe along its length, each shaft having an entry end and an exit end and a continuous helical rib extending along at least a part of the length of the shaft and running towards the pipe tester, said helical rib being adapted for engaging and for advancing at least one length of pipe along said shaft toward the pipe tester upon rotation of the shaft about its longitudinal axis, a movable stop member for engaging one end of a length of pipe to be tested to align it relative to one of said heads, said stop member being disposed adjacent said head which is movable into and out of pipe test position and being operably connected to said test head so that upon movement of said head out of pipe test position, said stop member travels into a position in front of and across said head opposite the other head for engaging one end of the length of pipe to be tested and so that upon movement of said head into pipe test position said stop member is removed from said position where it engages the end of the pipe to be tested, means drivingly connected to each of said shafts for rotating each about its longitudinal axis in a direction which causes a length of pipe disposed on said shaft to travel endwise thereon toward said movable stop member as said length of pipe is conveyed to said pipe tester, pick-off means for engaging and transferring a length of pipe from said one station onto said shafts and into engagement with said continuous helical rib for advancement of the length to the pipe tester, said pick-off means being disposed substantially adjacent the entry end of the shafts and being drivingly connected to said means for rotating said shafts to engage and transfer a length of pipe at predetermined intervals relative to rotation of said shafts.

2. The combination of claim 1 characterized by said pick-off means being an eccentric mounted upon said shafts adjacent their entry end and rotatable therewith, said eccentric being positioned thereon to engage and transfer a length of pipe from said holding means onto said shafts.

3. The combination of claim 1 characterized by stop means disposed adjacent said head to which the movable stop member is operatively connected, said stop means extending from said head towards the one station and being aligned with said movable stop member when said movable stop member is in position for engaging an end of a length of pipe.

4. The combination of claim 1 characterized by operable means disposed adjacent at least one of said shafts and connected to said shaft for raising and lowering it relative to said second station and a source of power controllably connected to said operable means to motivate same when desired.

5. The combination of claim 1 characterized by said shafts having adjacent their exit ends at least one notch on the periphery thereof for engaging said length of pipe and for depositing said length of pipe into said pipe tester at a location therein which location is aligned with the heads of said pipe tester, said depositing of the lengths of pipe onto said location in the pipe tester being upon rotation of said shafts to a predetermined position, said notches being aligned with said location in the pipe tester and being adapted for removing the pipe from the location in the tester by rotation of said shafts from said predetermined position whereby a periphery of said notch engages the pipe and lifts it from said location in the tester and the helical rib moves the pipe away from said pipe tester.

6. In pipe testing and handling apparatus for conveying lengths of pipe from one station to a pipe tester having two spaced apart heads, at least one of which is movable toward and away from the other, the combination comprising at least two shafts arranged substantially transverse relative to the lengths of pipe and relative to said pipe tester, said shafts being disposed in tandem so that each engages a part of a pipe along its length, each shaft having an entry end and an exit end and a continuous helical rib extending along at least a part of the length of the shaft and running towards the pipe tester, said helical rib being adapted for engaging and for advancing at least one length of pipe along said shaft toward the pipe tester upon rotation of the shaft about its longitudinal axis, means drivingly connected to each of said shafts for rotating each about its longitudinal axis in a direction which causes a length of pipe disposed on said shaft to travel thereon endwise toward one of said heads as said length of pipe is being conveyed from said station to the pipe tester, stop means disposed adjacent said one head toward which a length of pipe travels endwise, said stop means extending from said one head towards the one station and being in a vertical plane which is in front of and across said one head opposite the other head, pick-off means for engaging and transferring a length of pipe from the one station onto said shafts and into engagement with said continuous helical rib for advancement to the pipe tester, said pick-off means being disposed substantially adjacent the entry end of the shafts and being drivingly connected to said means for rotating said shafts to engage and transfer a length of pipe at predetermined intervals relative to the rotation of said shafts.

7. The combination of claim 6 characterized by said shafts having adjacent their exit ends at least one notch on the periphery thereof for engaging said length of pipe and for depositing said length of pipe into said pipe tester at a location therein which location is aligned with the heads of said pipe tester, said depositing of the lengths of pipe onto said location in the pipe tester being upon rotation of said shafts to a predetermined position, said notches being aligned with said location in the pipe tester and being adapted for removing the pipe from the location in the tester by rotation of said shafts from said predetermined position whereby a periphery of said notch engages the pipe and lifts it from said location in the tester and the helical rib moves the pipe away from said pipe tester.

8. On a test bench for hydraulically testing lengths of pipe and tubing placed between two spaced apart test heads, at least one of which is movable toward and away from the other, the combination comprising a stop member movably mounted upon said movable test head for travel into a position in front of and substantially across said movable test head and for travel out of said position, actuating means carried by said movable head and positioned to engage the stop member to cause it to travel into said position when said movable test head moves away from the other head and to cause it to travel out of said position when said movable test head moves toward the other head.

9. On a test bench for hydraulically testing lengths of pipe and tubing placed between two spaced apart test heads, at least one of which is movable toward and away from the other, the combination comprising a stop member, a support for said stop member pivotally mounted upon said movable test head for bringing said stop member into a position in front of and substantially across said movable test head and for removing said stop member from said position, actuating means carried by said test head and positioned to engage said support to effect bringing the stop member into said position when said movable test head travels away from the other head and to remove said stop member from said position when said test head travels toward the other head.

10. The combination of claim 9 characterized by said support carrying a cam and by said actuating means being a cam follower positioned to engage said cam.

11. Pipe handling apparatus for conveying at least one length of pipe from one station to a second station, the combination comprising at least two shafts arranged substantially transverse relative to the lengths of pipe and relative to the second station, said shafts being disposed in tandem so that each engages a part of a pipe along its length, each shaft having an entry end and an exit end and a continuous helical rib extending along at least a part of the length of the shaft and running towards the exit end, said helical rib being adapted for engaging and advancing at least one length of pipe along said shaft toward the exit end upon rotation of the shaft about its longitudinal axis, means drivingly connected to each of said shafts for rotating each about its longitudinal axis, pick-off means for engaging and transferring a length of pipe from said one station onto said shafts and into engagement with the continuous helical rib for advancement of the lengths to the second station, said pick-off means being disposed substantially adjacent the entry end of the shafts and being drivingly connected to said means for rotating said shafts to engage and transfer a length of pipe from the one station onto the shafts at predetermined intervals relative to rotation of said shafts, operable means disposed adjacent at least one of said shafts and connected to said shaft for raising and lowering it relative to said second station and a source of power controllably connected to said operable means to motivate same when desired.

12. Pipe handling apparatus for conveying at least one length of pipe from one station to a second station, the combination comprising at least two shafts arranged substantially transverse relative to the lengths of pipe and relative to the second station, said shafts being disposed in tandem so that each engages a part of a pipe along its length, each shaft having an entry end and an exit end and a continuous helical rib extending along at least a part of the length of the shaft and running towards the exit end, said helical rib being adapted for engaging and advancing at least one length of pipe along said shaft toward the exit end upon rotation of the shaft about its longitudinal axis, means drivingly connected to each of said shafts for rotating each about its longitudinal axis, pick-off means for engaging and transferring a length of pipe from said one station onto said shafts and into engagement with the continuous helical rib for advancement of the lengths to the second station, said pick-off means being mounted upon said shafts adjacent their entry end and being positioned thereon to engage and transfer a length of pipe from the one station onto said shafts at predetermined intervals relative to rotation of said shafts.

13. The combination of claim 12 characterized by said pick-off means being an eccentric.

14. Pipe handling apparatus for conveying at least one length of pipe from one station to a second station, the combination comprising at least two shafts arranged substantially transverse relative to the lengths of pipe and relative to the second station, said shafts being disposed in tandem so that each engages a part of a pipe along its length, each shaft having an entry end and an exit end and a continuous helical rib extending along at least a part of the length of the shaft and running towards the exit end, said helical rib being adapted for engaging and advancing at least one length of pipe along said shaft toward the exit end upon rotation of the shaft about its longitudinal axis, means drivingly connected to each of said shafts for rotating each about its longitudinal axis, pick-off means for engaging and transferring a length of pipe from said one station onto said shafts and into engagement with the continuous helical rib for advancement of the lengths to the second station, said pick-off means being disposed substantially adjacent the entry end of the shafts and being drivingly connected to said means for rotating said shafts to engage and transfer a length of pipe from the one station onto the shafts at predetermined intervals relative to rotation of said shafts, said shafts having adjacent their exit ends at least one notch on the periphery thereof for engaging said lengths of pipe and for depositing said lengths of pipe onto said second station upon rotation of said shafts to a predetermined position, said notches being adapted for removing said pipe from the second station by rotation of said shafts from said predetermined position.

15. The combination of claim 14 characterized by operable means disposed adjacent at least one of said shafts and connected to said shaft for raising and lowering it relative to said second station and a source of power controllably connected to said operable means to motivate same when desired.

16. Pipe handling apparatus for conveying at least one length of pipe from one station to a second station, the combination comprising at least two shafts arranged substantially transverse relative to the lengths of pipe and relative to the second station, said shafts being disposed in tandem so that each engages a part of a pipe along its length, each shaft having an entry end and an exit end and a continuous helical rib extending along at least a part of the length of the shaft and running toward the exit end, said helical rib being adapted for engaging and advancing at least one length of pipe along said shaft toward the exit end upon rotation of the shaft about its longitudinal axis, means drivingly connected to each of said shafts for rotating each about its longitudinal axis, pick-off means for engaging and transferring a length of pipe from said one station onto said shafts and into engagement with the continuous helical rib for advancement of the lengths to the second station, said pick-off means being disposed substantially adjacent the entry end of the shafts and being drivingly connected to said means for rotating said shafts to engage and transfer a length of pipe from the one station onto the shafts at predetermined intervals relative to rotation of said shafts, said shafts having adjacent their exit ends at least one notch on the periphery thereof for engaging said lengths of pipe and for depositing said lengths of pipe onto said second station upon rotation of said shafts to a predetermined position, said notches being aligned with said second station and being adapted for removing said pipe from the second station by rotation of said shafts from said predetermined position whereby the periphery of said notch engages the pipe and the helical rib moves the pipe away from said second station.

17. Pipe handling apparatus for conveying at least one length of pipe from one station to a second station, the combination comprising at least two shafts arranged substantially transverse relative to the lengths of pipe and relative to the second station, said shafts being disposed in tandem so that each engages a part of a pipe along its length, each shaft having an entry end and an exit end and a continuous helical rib extending along at least a part of the length of the shaft and running towards the exit end, said helical rib being adapted for engaging and advancing at least one length of pipe along said shaft toward the exit end upon rotation of the shaft about its longitudinal axis, means drivingly connected to each of said shafts for rotating each about its longitudinal axis, pick-off means for engaging and transferring a length of pipe from said one station onto said shafts and into engagement with the continuous helical rib for advancement of the lengths to the second station, said pick-off means being disposed substantially adjacent the entry end of the shafts and being drivingly connected to said means for rotating said shafts to engage and transfer a length of pipe from the one station onto the shafts at predetermined intervals relative to rotation of said shafts, stop means disposed transversely relative to said lengths of pipe and positioned adjacent the second station at one end thereof towards which the means for rotating said shafts urges said lengths of pipe as they are moved from the first station to the second station, said stop means exending from said second station toward said first station, said shafts having adjacent their exit ends at least one notch on the periphery thereof for engaging said lengths of pipe and for depositing said lengths of pipe onto said second station upon rotation of said shafts to a predetermined position, said notches being adapted for removing said pipe from the second station by rotation of said shafts from said predetermined position.

18. The combination of claim 17 characterized by operable means disposed adjacent at least one of said shafts and connected to said shaft for raising and lowering it relative to said second station and a source of power controllably connected to said operable means to motivate same when desired.

19. Pipe handling apparatus for conveying at least one length of pipe from one station to a second station, the combination comprising at least two shafts arranged substantially transverse relative to the lengths of pipe and relative to the second station, said shafts being disposed in tandem so that each engages a part of a pipe along its length, each shaft having an entry end and an exit end and a continuous helical rib extending along at least a part of the length of the shaft and running towards the exit end, said helical rib being adapted for engaging and advancing at least one length of pipe along said shaft toward the exit end upon rotation of the shaft about its longitudinal axis, means drivingly connected to each of said shafts for rotating each about its longitudinal axis, pick-off means for engaging and transferring a length of pipe from said one station onto said shafts and into engagement with the continuous helical rib for advancement of the lengths to the second station, said pick-off means being disposed substantially adjacent the entry end of the shafts and being drivingly connected to said means for rotating said shafts to engage and transfer a length of pipe from the one station onto the shafts at predetermined intervals relative to rotation of said shafts, stop means disposed transversely relative to said lengths of pipe and positioned adjacent the second station at one end thereof towards which the means for rotating said shafts urges said lengths of pipe as they are moved from the first station to the second station, said stop means extending from said second station toward said first station, said shafts having adjacent their exit ends at least one notch on the periphery thereof for engaging said lengths of pipe and for depositing said lengths of pipe onto said second station upon rotation of said shafts to a predetermined position, said notches being aligned with said second station and being adapted for removing said pipe from the second station by rotation of said shafts from the predetermined position whereby the periphery of said notch engages the pipe and the helical rib moves the pipe away from said second station.

20. In pipe testing and handling apparatus for conveying lengths of pipe from one station to a pipe tester having two spaced apart heads, at least one of which is movable toward and away from the other, the combination comprising at least two shafts arranged substantially transverse relative to the lengths of pipe and relative to said pipe tester, said shafts being disposed in tandem so that each engages a part of a pipe along its length, each shaft having an entry end and an exit end and a continuous helical rib extending along at least a part of the length of the shaft and running towards the pipe tester, said helical rib being adapted for engaging and for advancing at least one length of pipe along said shaft toward the pipe tester upon rotation of the shaft about its longitudinal axis, a movable stop member for engaging one end of a length of pipe to be tested to align it relative to one of said heads, said stop member being disposed adjacent said head which is movable into and out of pipe test position and being operably connected to said test head so that upon movement of said head out of pipe test position, said stop member travels into a position in front of and across said head opposite the other head for engaging one end of the length of pipe to be tested and so that upon movement of said head into pipe test position said stop member is removed from said position where it engages the end of the pipe to be tested, means drivingly connected to each of said shafts for rotating each about its longitudinal axis in a direction which causes a length of pipe disposed on said shaft to travel endwise thereon toward said movable stop member as said length of pipe is conveyed to said pipe tester, pick-off means for engaging and transferring a length of pipe from said one station onto said shafts and into engagement with said continuous helical rib for advancement of the length to the pipe tester, said pick-off means being disposed substantially adjacent said entry end of the shafts and being drivingly connected to means for motivating it to engage and transfer a length of pipe from the first station onto said shaft.

21. The combination of claim 20 characterized by said shafts having adjacent their exit ends at least one notch on the periphery thereof for engaging said length of pipe and for depositing said length of pipe into said pipe tester at a location therein which location is aligned with the heads of said pipe tester, said depositing of the lengths of pipe onto said location in the pipe tester being upon rotation of said shafts to a predetermined position, said notches being aligned with said location in the pipe tester and being adapted for removing the pipe from the location in the tester by rotation of said shafts from said predetermined position whereby a periphery of said notch engages the pipe and lifts it from said location in the tester and the helical rib moves the pipe away from said pipe tester.

22. The combination of claim 20 characterized by operable means disposed adjacent at least one of said shafts and connected to said shaft for raising and lowering it relative to said second station and a source of power controllably connected to said operable means to motivate same when desired.

23. The combination of claim 20 characterized by operable means disposed adjacent at least one of said shafts and connected to said shaft for raising and lowering it relative to said second station and a source of power controllably connected to said operable means to motive same when desired and by said shafts having adjacent their exit ends at least one notch on the periphery thereof for engaging said length of pipe and for depositing said length of pipe into said pipe tester at a location therein which location is aligned with the heads of said pipe tester, said depositing of the lengths of pipe onto said location in the pipe tester being upon rotation of said shafts to a predetermined position, said notches being aligned with said location in the pipe tester and being adapted for removing the pipe from the location in the tester by rotation of said shafts from said predetermined position whereby a periphery of said notch engages the pipe and lifts it from said location in the tester and the helical rib moves the pipe away from said pipe tester.

References Cited in the file of this patent

UNITED STATES PATENTS

| | | |
|---|---|---|
| 2,199,130 | Hazeltine | Apr. 30, 1940 |
| 2,726,754 | Rodder | Dec. 13, 1955 |

UNITED STATES PATENT OFFICE
CERTIFICATE OF CORRECTION

Patent No. 2,959,268            November 8, 1960

William Mynard McConnell

It is hereby certified that error appears in the printed specification of the above numbered patent requiring correction and that the said Letters Patent should read as corrected below.

Column 6, line 58, for "fo" read -- of --; column 11, line 28, for "toward" read -- towards --; column 14, line 14, for "motive" read -- motivate --.

Signed and sealed this 25th day of April 1961.

(SEAL)
Attest:

ERNEST W. SWIDER
Attesting Officer

DAVID L. LADD
Commissioner of Patents